United States Patent [19]
Mayer et al.

[11] Patent Number: 5,366,290
[45] Date of Patent: * Nov. 22, 1994

[54] HIGH TEMPERATURE OPTICAL PROBE

[75] Inventors: Christopher R. Mayer, Windham, N.H.; Leon Reznikov, Salem, Mass.

[73] Assignee: Ametek, Inc., New York, N.Y.

[ * ] Notice: The portion of the term of this patent subsequent to Jan. 11, 2011 has been disclaimed.

[21] Appl. No.: 71,247

[22] Filed: Jun. 2, 1993

Related U.S. Application Data

[63] Continuation-in-part of Ser. No. 916,791, Jul. 17, 1992, Pat. No. 5,277,496, which is a continuation of Ser. No. 599,403, Oct. 17, 1990, abandoned.

[51] Int. Cl.$^5$ .............. G01K 1/14; G01K 1/10; G01K 1/12; G01K 13/02; G01J 5/04
[52] U.S. Cl. .............. 374/130; 374/131; 374/208; 374/144; 250/338.1; 250/340
[58] Field of Search ........ 374/208, 130, 131, 139, 374/140, 144, 148; 356/43; 250/340, 338.1

[56] References Cited

U.S. PATENT DOCUMENTS

| | | | |
|---|---|---|---|
| 2,490,617 | 12/1949 | Bristol | 374/140 |
| 3,716,450 | 2/1973 | Lions | 374/208 |
| 3,913,058 | 10/1975 | Nishio et al. | 374/144 |
| 4,152,938 | 5/1979 | Danninger | 374/148 |
| 4,178,798 | 12/1979 | Wessel | 374/144 |
| 4,630,939 | 12/1986 | Mayes | 374/138 |
| 4,657,385 | 4/1987 | Pointer | 374/130 |
| 4,780,832 | 10/1988 | Shah | 374/130 |
| 4,796,671 | 1/1989 | Furushima et al. | 374/208 |

FOREIGN PATENT DOCUMENTS

| | | | |
|---|---|---|---|
| 0038980 | 3/1977 | Japan | 374/144 |
| 0058109 | 5/1979 | Japan | 374/144 |
| 0111428 | 5/1986 | Japan | 374/208 |
| 1321327 | 12/1989 | Japan | 374/208 |
| 1334550 | 10/1973 | United Kingdom | 374/208 |
| 2045433 | 10/1980 | United Kingdom | 374/208 |
| 2045921 | 11/1980 | United Kingdom | 374/131 |

Primary Examiner—Diego F. F. Gutierrez
Attorney, Agent, or Firm—Amster, Rothstein & Ebenstein

[57] ABSTRACT

A high temperature optical probe for an optical gas temperature sensor includes a support, a generally conical hollow tip, and a joint physically interconnecting the support and the tip. The tip includes as an electromagnetic radiation emitter a sapphire-free ceramic selected from the group consisting of silicon carbide and silicon nitride. An optical lens supported in the tip is removable from the tip for repair and replacement. The joint is of a material and geometry to accommodate the thermal stresses caused by differences in thermal coefficients of expansion between the tip, joint and support, and the mechanical stresses caused by the interaction of the probe and the gas stream during high velocity movement of the gas stream past the tip. The joint sidewall is welded to the support and has a thickness of 0.008–0.012 inch where it overlaps the tip.

15 Claims, 6 Drawing Sheets

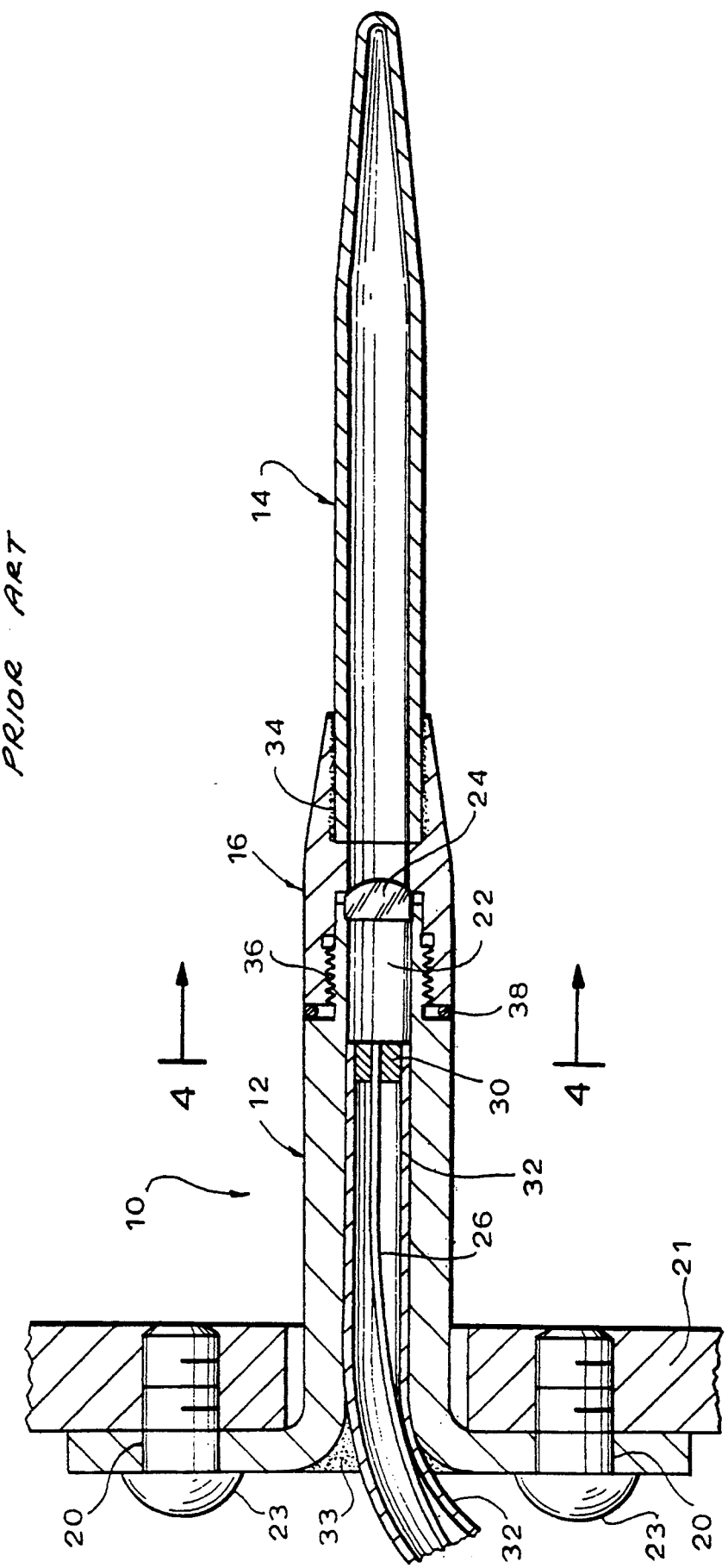

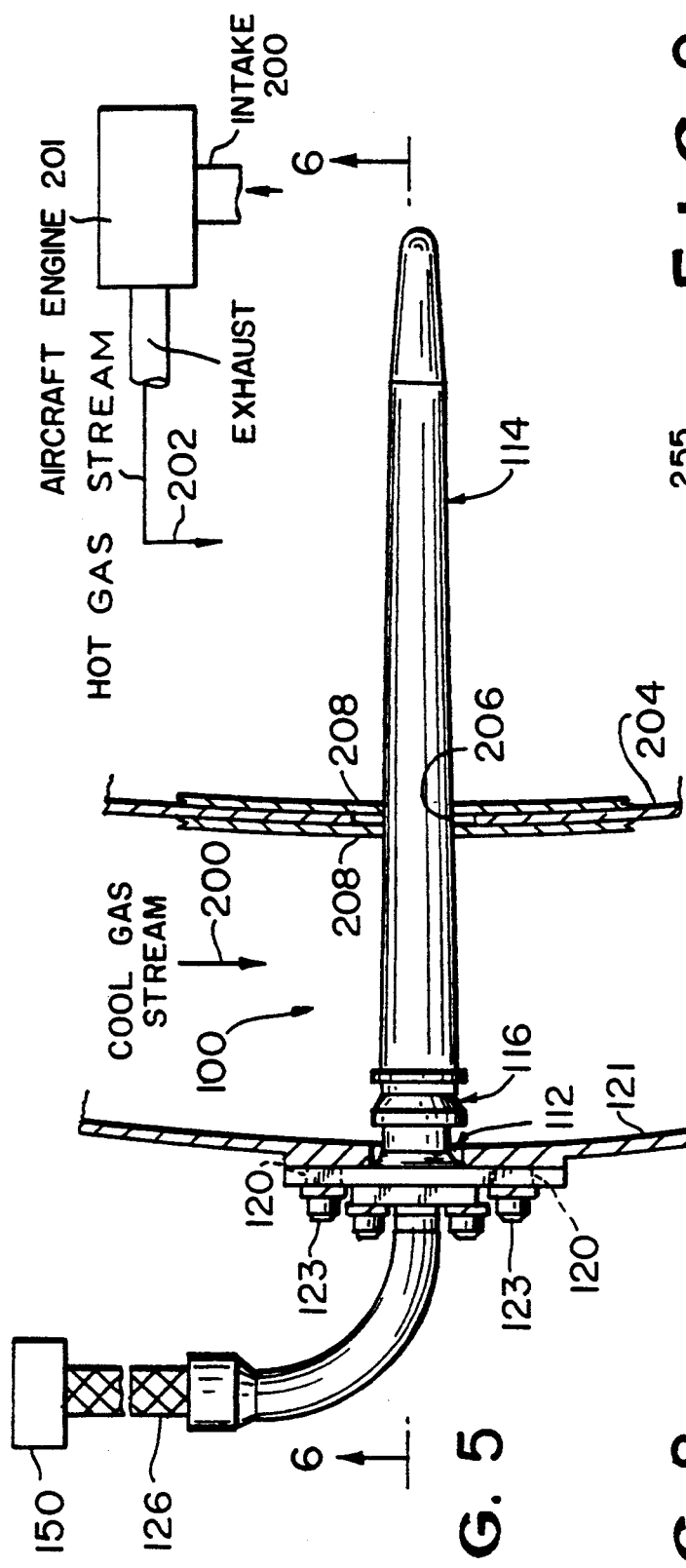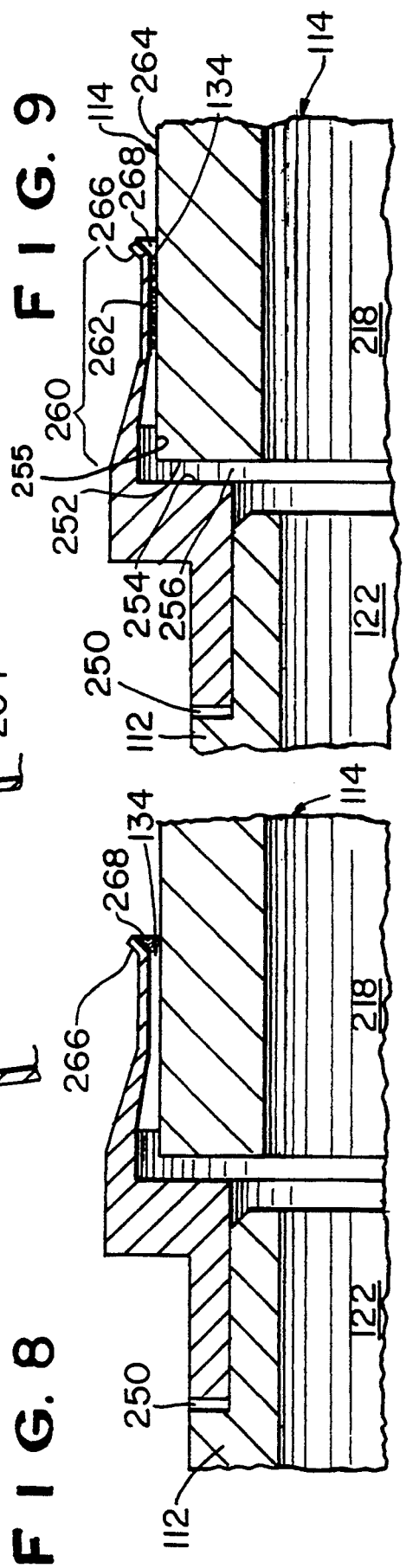

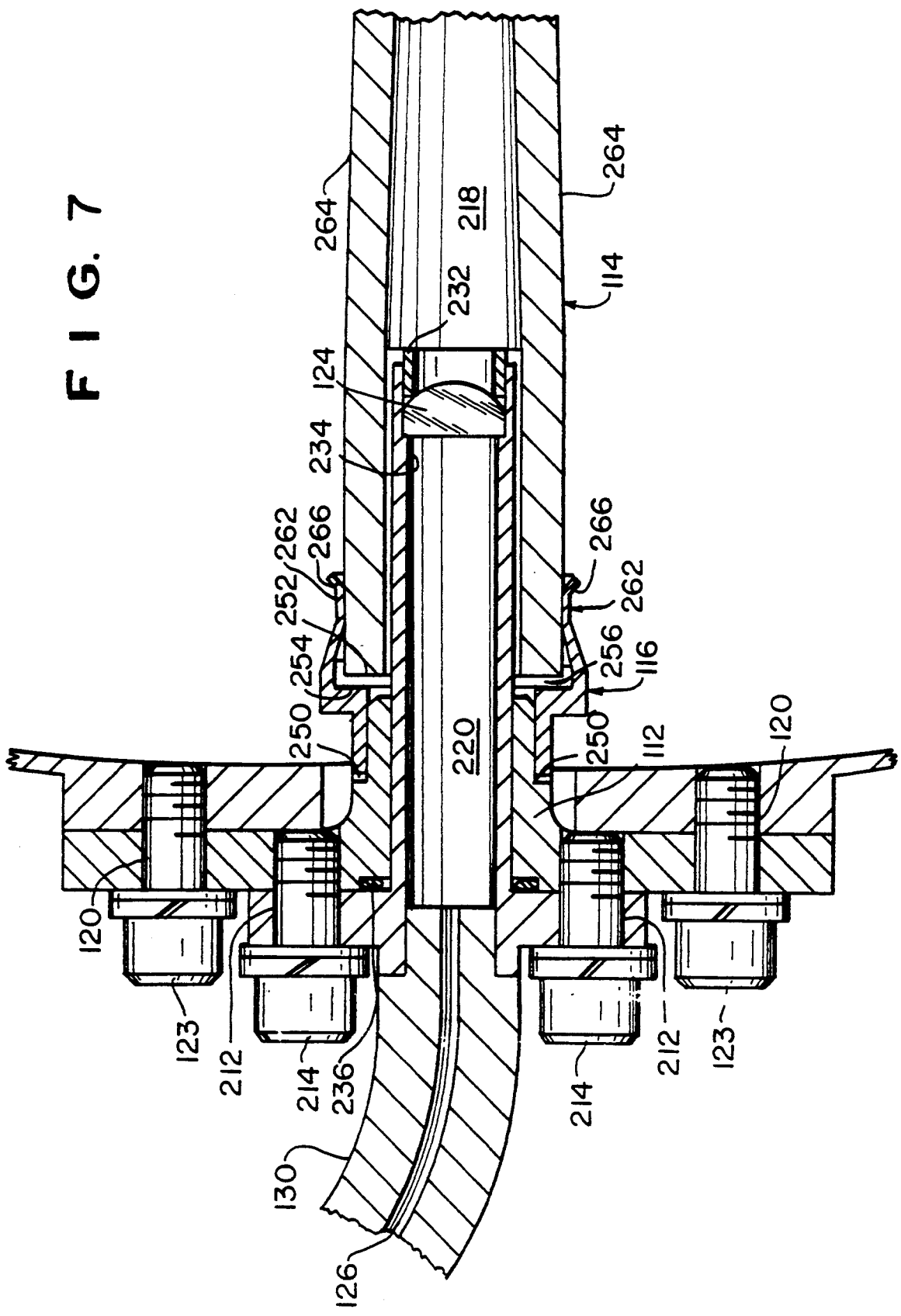

HIGH TEMPERATURE OPTICAL PROBE

CROSS-REFERENCE TO RELATED APPLICATION

This is a continuation-in-part of Ser. No. 07/916,791, filed Jul. 17, 1992, now U.S. Pat. No. 5,277,496, which is a continuation of Ser. No. 07/599,403 filed Oct. 17, 1990, now abandoned.

BACKGROUND OF THE INVENTION

The present invention relates to an optical gas temperature sensor, and more particularly to a high temperature probe therefor.

Optical gas temperature sensors are well known in the art. Such a sensor is conventionally used by immersing the probe (and more particularly the conical tip of the probe) in the hot gas stream to be measured, and allowing the probe to remain until it is heated to approximately the temperature of the hot gas stream. At that temperature, infrared light (typically 1.0 to 1.7 microns in wave length) is emitted from the inner surface of the probe tip (which may contain a separate emitter), selected by an optical lens within the tip, and focussed by the lens onto a fiber optic or light guide for transmission to a photodiode. The photodiode converts the focussed light into an electrical current, amplifiers in an optoelectronic unit condition the analog signal, and a program in a computer or microprocessor converts the analog signal into usable engineering units of temperature.

U.S. Pat. No. 4,770,544 describes an optical gas temperature sensor having a high temperature probe formed of a single crystal sapphire rod divided into a waveguide region and a cavity region. The cavity region is generally conical and is coated with an infrared radiation emitter having a high melting temperature, such as sputtered iridium. The iridium coating is in turn being covered by a protective coating, such as sputtered alumina. The nature of the materials used to form the high temperature probe of an optical gas temperature sensor may vary considerably. Some materials require the use of a separate emitter in order to provide infrared radiation in response to the sensed temperatures, while others do not. Many of the probes utilize materials such as refractory materials (including oxides of aluminum, silicon, zirconium and yttrium), black bodies formed of finely dispersed carbon and a silicon adhesive, quartz or glass, noble metals, steel, luminescent materials, and the like.

While a variety of different materials have been used for the probes, as noted above, the most common probes are sapphire probes provided in various shapes and with various coatings. However the sapphire probes have not proven to be entirely satisfactory. The probe tips are subjected to extreme thermal shock (on the order of 1,000° F. per second), high temperature stress, oxidizing and salt atmospheres at high temperatures (e.g., those found in aircraft engines), and the like. The sapphire probes tend to fracture quickly when cooled from 2500° F. to 70° F. by air nozzles in tests that approximate an engine environment. Sapphire probes under a 5000 psi bending stress can creep or deform at 2500° F. and are not well suited for meeting 5000-hour life requirements. Where the emissivity of the sapphire is supplemented by an emitter coating (such as iridium) or fitted with an insert of emitting material, the coating or emitted insert tends to erode within several hours of exposure to engine gas, with substantial temperature errors resulting. Accordingly, the need remains for a high temperature probe for an optical gas temperature sensor having a high flexural strength (defined as exceeding 50,000 psi at 2,500° F. on a four-point bending test), a low creep rate (defined as a creep rate of $5 \times 10^{-10}$ sec$^{-1}$ with up to 5,000 psi stress at 2,500° F. which produces 1% strain over a 5,000 hour life), a high oxidation resistance (defined as less than 1% weight loss for a 5,000-hour life at 2,500° F. and as assessed during a 3,500-hour thermal cycling test using exhaust gases), and a high thermal shock resistance (defined as the capacity to withstand repeated cycling shocks from 2,500° F. to 1,000° F. within 3 seconds or 500° F./second, as could be applied with a high velocity torch and air gun). Additionally, the probe must exhibit a low thermal response time constant so that it responds rapidly to variations in the temperature of the gas stream. A one-second time constant under engine air flow conditions is generally acceptable and is the current practice with conventional thermocouple and engine control designs. Thin walls are required at the probe tip to insure adequately fast thermal response.

U.S. patent application Ser. No. 916,791, filed Jul. 17, 1992, now U.S. Pat. No. 5,277,496, discloses such a non-sapphire high temperature probe for an optical gas temperature sensor. Nonetheless, even this probe is susceptible to improvement. As earlier noted, an optical lens is supported in the tip of the probe and is responsive to the temperature of the gas stream proximate the tip for focusing and transmitting electromagnetic radiation emitted from the tip (in response to the temperature of the gas stream proximate the tip) in order to effect the measurement of the gas stream. However, as is well known in the optical probe art, the maintenance of the probe tip at a high temperature results in the high temperature emissions of impurities which accumulate on the optical lens and eventually interfere with its efficiency. In probes of the type described, the optical gas was a fixed and permanent part of the probe tip and could not be removed therefrom for repair (that is, cleaning to remove the impurities collected thereon from the high temperature emissions of the tip) or, when necessary, replacement thereof. Thus, although the optical lens is but a small factor in the total cost of the probe, the optical lens could not be replaced or repaired without replacement of the much more costly probe itself.

Further, while the material of the joint was selected to accommodate the thermal stresses and the mechanical stresses to which the probe was subjected, there remained a high failure rate for the tip where it was contacted by the joint or the high temperature braze between the tip and the joint.

Accordingly, it is an object of the present invention to provide an improved high temperature optical probe for an optical gas temperature sensor.

Another object is to provide such a probe which has a high flexural strength, a low creep rate, a high oxidation resistance, and a high thermal shock resistance.

A further object is to provide such a probe which has a low thermal response time constant.

It is also an object of the present invention to provide such a probe wherein the optical means is easily removable from the tip for repair (including cleaning) and/or replacement.

It is another object to provide such a probe wherein in one embodiment the joint has a geometry which minimizes failure of the tip at and adjacent the joint/tip interface.

It is a final object to provide such a probe which is of simple and economical construction, easy to maintain, and easy to use.

SUMMARY OF THE INVENTION

It has now been found that the above and related objects of the present invention are obtained in an optical probe for sensing the temperature of a high-temperature, high-velocity gas stream. The probe comprises a support, a generally conical hollow tip, a joint physically interconnecting the support and the tip. An optical means is disposed in the tip.

The generally conical hollow tip for insertion into the gas stream is formed of a ceramic selected from the group consisting of silicon carbide and silicon nitride (preferably silicon carbide) to emit electromagnetic radiation at the high temperatures to be sensed. The tip defines a longitudinally-extending sidewall. The support mounts the tip for interaction with the high-temperature, high-velocity gas stream. The joint physically interconnects and spaces apart the support and the tip. The joint is of a material and geometry to accommodate the thermal stresses caused by differences in thermal coefficients of expansion between the tip, the joint and the support and the mechanical stresses caused by the interaction of the probe and the gas stream during high velocity movement of the gas stream past the tip, thereby to enable the probe to withstand the stresses. The joint is welded to the support and defines a longitudinally-extending sidewall having a portion thereof overlapping and supporting a longitudinally-extending portion of the tip sidewall. The optical means, disposed in the tip and responsive to the temperature of the gas stream proximate the tip, focuses and transmits electromagnetic radiation emitted from the tip in response to the temperature of the gas stream proximate the tip in order to effect a measurement of the temperature of the gas stream.

In a preferred probe, the ceramic tip is sintered, dark colored and emits infrared radiation energy. It has a high flexural strength (in excess of 50,000 psi at 2,500° F.), a high oxidation resistance, a high thermal shock resistance and a low thermal response time constant. The support is formed of high temperature alloy steel (such as Hastalloy X), and the joint is formed of a material having a coefficient of thermal expansion (CTE) that matches the ceramic CTE within 3 ppm/°F., such as molybdenum or Kovar. The joint is connected to the support by a weld (such as a laser weld) and to the tip by a high temperature braze (e.g., silver or an alloy of silver and copper).

In a first preferred embodiment of the present invention, the optical means is removably supported in the tip, thereby to enable repair and replacement of the optical means without removal of the tip. The optical means comprises a lens positioned within the tip to focus infrared energy emitted from the tip, and the probe additionally includes an optical fiber positioned proximate the lens to transmit focused infrared energy to an infrared detector, and an infrared detector for providing a measurement of the temperature of the gases in the gas stream.

In a second preferred embodiment of the present invention, the joint sidewall portion has a thickness of 0.008–0.012 inch (preferably 0.010 inch). The joint and the tip are in physical contact only through a high temperature braze disposed intermediate the sidewall portions. The back outer corner of the tip is spaced from the joint.

The present invention also encompasses, in combination, an aircraft engine producing a high velocity, high-temperature exhaust gas stream, and the optical probe with its tip disposed in the exhaust gas stream.

BRIEF DESCRIPTION OF THE DRAWING

The above brief description, as well as further objects, features and advantages of the present invention, will be more fully understood by reference to the following detailed description of the presently preferred, albeit illustrative, embodiments of the present invention when taken in conjunction with accompanying drawing wherein:

FIG. 2 is a fragmentary sectional view thereof, to an enlarged scale, taken along the line 2—2 of FIG. 1;

FIG. 5 is a fragmentary side elevational view of a second embodiment of a high temperature probe illustrated in the environment of an aircraft engine exhaust;

FIG. 7 is a fragmentary sectional view thereof, to an enlarged scale; and

FIGS. 8 and 9 are fragmentary sectional views of the joint portion of the probe, to an enlarged scale, before and after high temperature brazing, respectively.

DETAILED DESCRIPTION OF THE PREFERRED EMBODIMENTS

Figure 1:
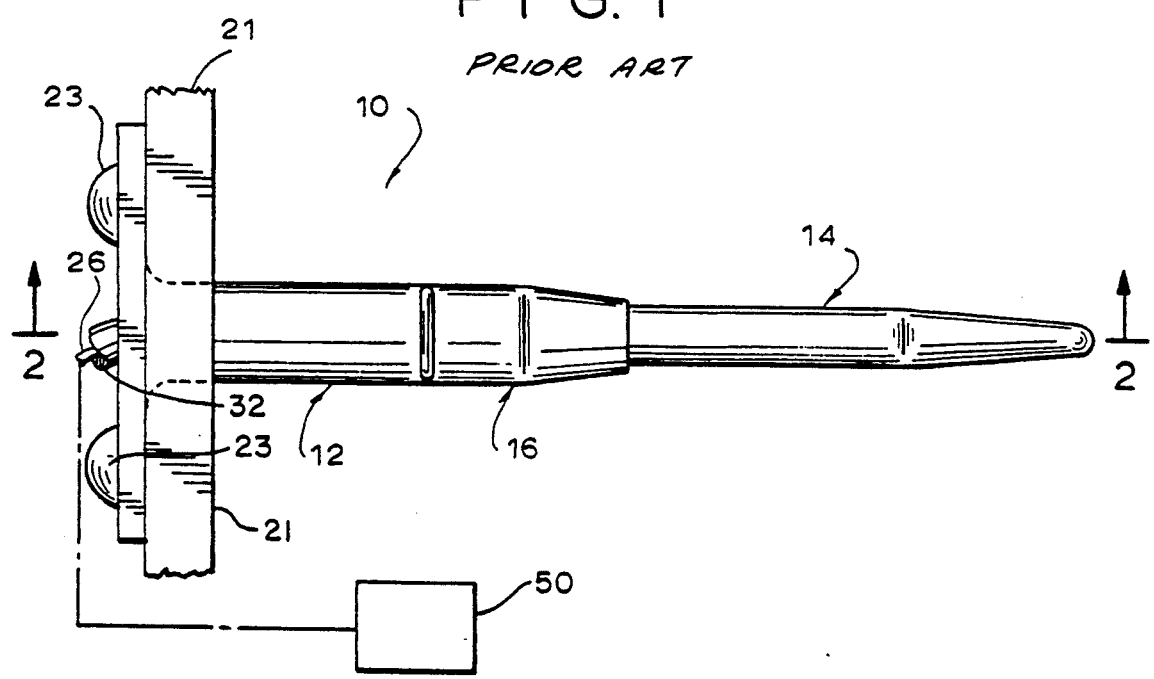
FIG. 1 is a fragmentary side elevational view of a first embodiment of a high temperature probe according to the present invention.
Figure 4:
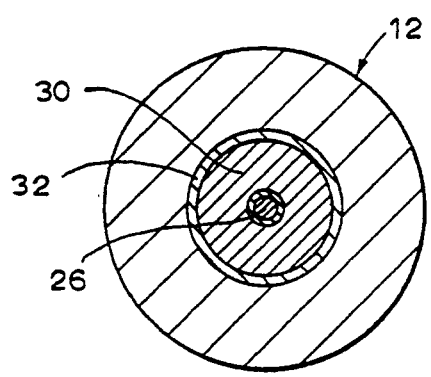
FIG. 4 is a sectional view thereof, to a slightly enlarged scale, taken along the line 4—4 of FIG. 2.

Referring now to the drawing, and in particular to FIG. 1 thereof, therein illustrated is a first embodiment of a high temperature optical probe, generally designated by the reference numeral 10, according to the present invention for use in an optical gas temperature sensor. The high temperature probe comprises in its basic aspects an axially hollow base or support generally designated 12, a generally conical hollow tip generally designated 14, and a joint, generally designated 16, physically interconnecting the support 12 and the tip 14.

The support 12 is used to position the tip 14 within the gas stream whose temperature is to be measured. Accordingly, the configurations and dimensions of the support may vary greatly without affecting operation of the probe. The support 12 is illustrated as "T"-shaped with the vertical element of the "T" being a hollow cylinder. Preferably the horizontal bar of the "T" includes apertures 20 for fastening the support 12 to a wall 21, piping, etc.—e.g., using screws 23 or bolts.

As is conventional in the art, the support 12 defines an axial hollow 22 and contains, adjacent the front, lens 24 configured and dimensioned to receive infrared light from the tip 16 and to focus that light onto a high temperature light waveguide 26 extending longitudinally into the axial hollow 22. The waveguide 26 extends rearwardly out the back of the axial hollow 22 of the support 12 and has its front end maintained within the axial hollow 22 by an annular fitting 30 such as a centrally apertured stainless steel disk. The waveguide 26 is preferably a gold-coated silica fiber, although glass fibers and other conventional optical waveguide materials may also be used advantageously. The waveguide 26 (and typically the fitting 30) are disposed inside a tubular protector 32, such as a stainless steel tube. The waveguide 26 and protector 32 are fastened to the support 12 by conventional means, for example, a low temperature braze 33 connecting the support 12 with the protector 32. The fitting 30 may be sealed on its outer surface to the protector 32 and on its inner surface to the waveguide 26 by a conventional weld (not shown). The rear end of the waveguide 26 transmits the light to a photodiode so which, with the aid of conventional amplifiers and a computer or microprocessor program, converts the electrical signal output of the photodiode into usable engineering units of temperature, such as degrees Fahrenheit or Celsius. The body of the support 12 is preferably formed of metal, and in particular a high temperature, high strength superalloy of nickel and iron available under the trade name Hastalloy X.

The generally conical hollow tip 16 is formed of, and uses as an electromagnetic radiation emitter, a sapphire-free ceramic which, at the high temperatures to be sensed, emits infrared radiation. The sapphire-free ceramic is selected from the group consisting of silicon carbide (SiC) and silicon nitride ($Si_3N_4$). The ceramics can be formed by various conventional manufacturing techniques; e.g., sintering. These dark colored ceramic materials exhibit a sufficiently high emissivity such that an additional emitter coating or insert is not required. Furthermore, the narrow angle conical cavity produces numerous reflections, and hence provides an effective emissivity nearly equal to unity. At 2,500° F., these materials have a high flexural strength exceeding 50,000 psi on a four-point bending test and a slow creep rate not exceeding $10^{-13} sec^{-1}$ with up to 5 000 psi stress (at 2,5000° F. which produces a 1% strain over a 5,000-hour life) , which is two orders of magnitude smaller than $10^{-11} sec^{-1}$, the maximum allowed. The high oxidation resistance of the materials, as assessed during a 3500 hour thermal cycling test using exhaust gases, is found to be less than a 1% weight loss for the 5,000-hour life and thus superior to metals. Cones made of these materials have withstood repeated cycling shocks from 2500° F. to 1,000° F. within 3 seconds (500° F./sec) as could be created by high velocity torches and air guns. Hollow cone-shape tips formed with these materials exhibit a low (fast) thermal response time constant of approximately one second or less under engine air flow conditions, although similarly formed coated sapphire rods respond faster because the emitter layer is very thin compared to the wall thickness of the present invention.

The tip 14 has a wall thickness of about 0.030 inch, a length of about 2.50 inches, and an outer diameter of about 0.256 inch. Thus the length/diameter ratio is about 10 to 1. Higher ratios result in longer probes which enable the probe to extend further into the interiors of large engines. Thinner walls, especially at the forward end of the tip, improve the response time, but also compromise the life and durability of the probe. Accordingly, depending upon the relative importance placed on response time as opposed to longevity, thinner or thicker walls may be used relative to the recommended 0.030 inch wall illustrated.

The joint 16 connects the tip 14 to the support 12 so that the support 12 can position the tip 14 in the gas stream whose temperature is to be measured. The joint 16, which will typically be exposed to a temperature of about 700° F., must accommodate the mis-match in the thermal expansion between the ceramic of the tip 14 and the metal of the support 12. While the joint 16 is located out of the hot gas stream, it must still be able to withstand occasional temperatures as high as 1200° F. It has been found that the thermal expansion of molybdenum and Kovar (an iron/nickel/cobalt/manganese alloy) match the silicon carbide and silicon nitride materials very closely. The most severe stresses arise when the joint 16 is brazed at 2500° F. to the tip 14 and then cools within seconds. The joint material shrinks more than the tip material, thereby putting the joint material in tension and the tip material in compression. Stress analysis indicates that stresses on the order of 35,000 psi can result, such a stress being well within the capabilities of the aforementioned joint materials.

The joint 16 is secured at its front end to the tip 14 by a high temperature braze 34, such as a conventional silver/copper braze, and at its rear end to the support 12 by a threaded engagement 36. More particularly, the front end of the support 12 is externally threaded and the rear end of the joint 16 is internally threaded and adapted to receive therein in threaded engagement the externally threaded front end of the support 12. A metallic O-ring 38 formed, for example, of Hastalloy X is placed between the rear face of the joint 16 and the abutting front face of the support 12 so as to seal the hollow space 22.

While the present invention is described above in terms of a three-part construction including a silicon carbide or a silicon nitride tip 14, a metal support 12, and a interconnecting joint 16, alternative constructions may also be used. For example, a one-piece probe construction formed exclusively of silicon carbide or silicon nitride may be used, with a lens barrel including a standard optical fiber and focussing lens system being inserted into and brazed to the support 12. Alternatively, a two-piece probe construction may be used, with the tip 14 and support 12 being formed of the same silicon carbide or silicon nitride, and the two pieces 12, 14 being joined by a high temperature braze. In the two-piece construction, all parts exhibit identical thermal expansions and the brazed joints are all located well inside the cooler zone of the engine. A lens barrel leading to a fiber optic cable is inserted into the support hollow and sealed at the interface of the two pieces.

As is conventional in high temperature optical sensors, the sensor may employ a plurality of probes disposed in staggered relationship across the path of the high temperature gas stream in order to develop a portrait of the gas temperature profile in the stream. The various probes, with their independent tips, focusing lenses and fiber optic cables, can be joined into a probe assembly extending across the gas stream path in the nature of a rake, with the probe assembly providing indication of the gas temperature profile.

Commercially available ceramics contain numerous additives which improve strength, toughness, moldability, sintering, and other properties. These additives are tailored to meet the specific performance objectives of various applications. They typically improve one wanted characteristic, such as fracture toughness, but may reduce a property having lesser importance in the particular application, such as corrosion resistance.

Commercially available alpha SiC or $Si_3N_4$ may contain up to 15% by weight of additives. Advancements in ceramic technology will improve the physical properties through blends of additives, higher purity and other means. The terms "silicon carbide" and "silicon nitride", as used herein and in the claims, encompass both ceramics wherein the majority of material is SiC or $Si_3N_4$ and ceramics commercially known as such.

To summarize, the present invention provides an improved high temperature probe for an optical gas temperature sensor, the probe exhibiting a high flexural strength, a low creep rate, a high oxidation resistance, and a high thermal shock resistance as well as a fast thermal time constant. The probe is of simple and economical construction, easy to maintain and easy to use.

Referring now to FIGS. 5-9, therein illustrated is a second embodiment 100 of the present invention. Elements of the second embodiment 100 which are structurally or functionally similar to elements of the first embodiment 10 will be indicated by the corresponding numerals in the 100 series. While the second embodiment 100, as illustrated, incorporates both a removable optical means feature and an improved joint geometry feature (as will be explained hereinafter in further detail), it will be readily appreciated that, depending upon the intended application of this embodiment, only one of these features need be incorporated.

Referring now to FIG. 5 in particular, in order to maintain the joint 116 and support 112 relatively cool vis-a-vis the tip 114, the back end of the tip 114, the entire length of the joint 116 and a forward portion of the support 112 are preferably disposed in a gas stream (see arrow 200) which is cool relative to the hot gas stream (see arrow 202), bounded by walls 121, 204, in which the front end of the tip 114 is immersed. The two gas streams 200, 202 (which may be the fuel stream to an engine 201 and the exhaust stream from the engine 201, respectively) are separated by a wall 204 of a duct or the like having aperture 206 for passage of the front portion of the tip 114 therethrough. The probe may make a conventional floating seal with the wall 204, with a pair of washers 208 being secured to the probe tip 114 about the aperture 206 and effectively sealing the aperture 206 about the tip 114.

Figure 6:
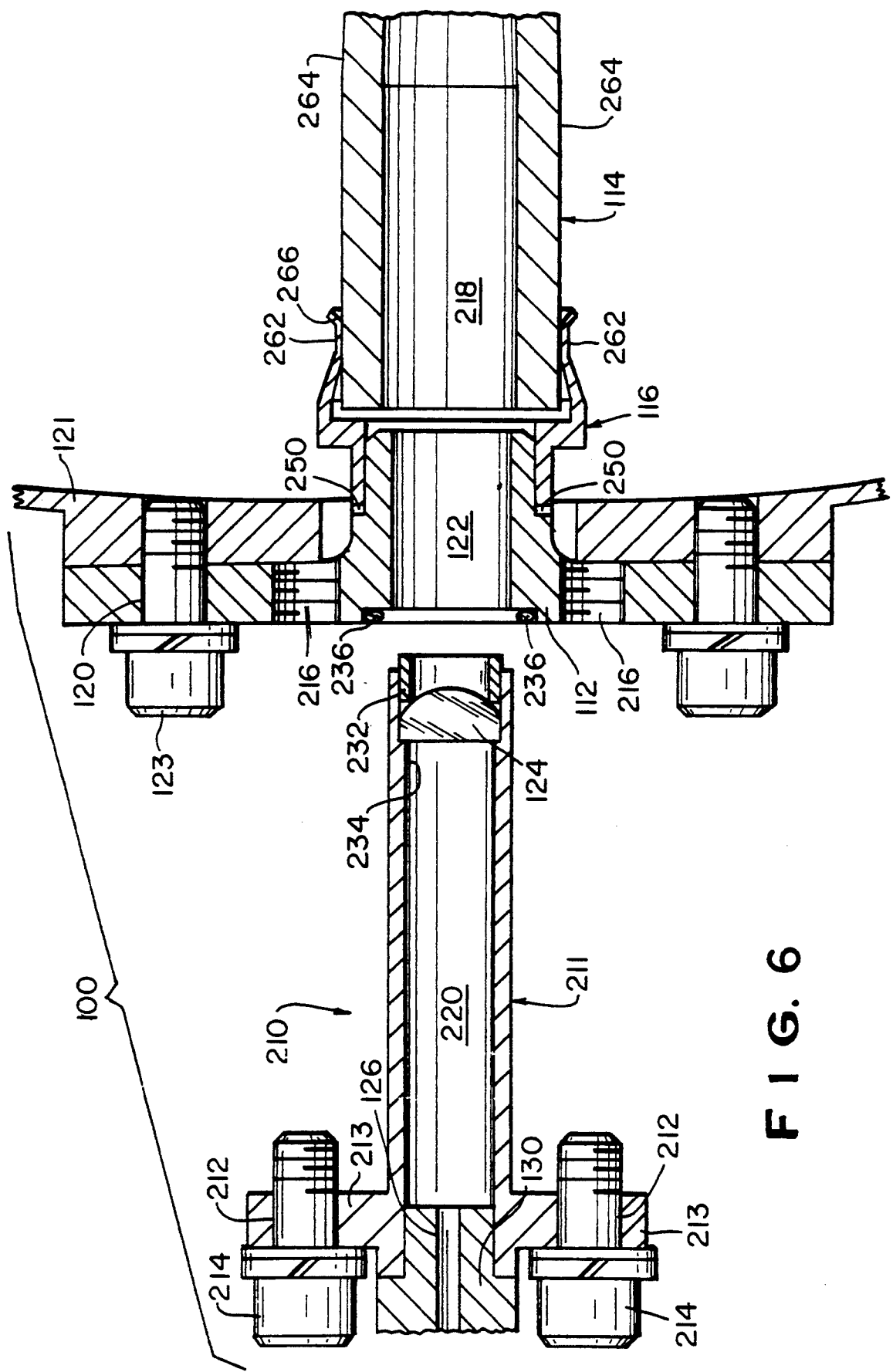
FIG. 6 is a fragmentary exploded sectional view thereof, to an enlarged scale and taken along the line 6—6 of FIG. 5, showing the optical means separated from the remainder of the probe.

Referring now to FIG. 6 in particular, therein illustrated, separated from each other, are a removable optical system 210 and the remainder of the probe (including the tip 114, joint 116 and support 112). Like the support 112, the optical system 210 is of a generally T-shaped configuration. The vertical bar of the "T" is illustrated as a horizontal cylinder generally designated 211 and defining an axial hollow 200, and the horizontal bar of the "T" is illustrated as vertical flanges 213 defining apertures 212 for fastening the optical system 210 to the support 112—e.g., using screws 214 or bolts adapted to pass through apertures 212 and be received in apertures 216 at the back end of the support 112. The hollow cylinder 211 is configured and dimensioned to be received within the axial hollow 122 of support 112 and at least the rear portion of the axial hollow 218 of the tip 114. It will be appreciated that the cylinder 211 acts as the tubular protector 32 of the first embodiment 10.

The optical lens 124 is disposed adjacent the front of the axial hollow 220 of the optical system cylinder 211, sandwiched between a retaining element 232 laser welded at the front thereof and a counterbore 234 (i.e., an inwardly directed flange or reduced diameter portion of the axial hollow 220). The lens 124 is configured and dimensioned to receive infrared light from the tip 116 and to focus that light onto a high temperature light waveguide 126 extending longitudinally into the axial hollow 220 of the optical system 210 and secured thereto by a fitting 130. The waveguide 126 extends rearwardly out the back of the axial hollow 220 and communicates with an infrared detector 150 for providing a measurement of the gases in the gas stream 202.

The cylinder 211, the flanges 213 and the retaining element 232 of the optical system 210 are preferably formed of stainless steel, although other materials may also be used. A high temperature O-ring 236 is preferably disposed within the support 112 to ensure a gas-tight connection between the flanges 213 of the optical system 210 and the support 112.

The optical system 210 is easily removed from the assembled probe 100 (as illustrated in FIG. 7) simply by loosening the screws or bolts 214 from apertures 216 of support 112 and then sliding the entire optical system 210 rearwardly out of the remainder of the probe 100. After cleaning or repair, the optical system 210 is easily replaced by properly positioning the O-ring 236 and hollow cylinder 211 in the remainder of the probe 100 then retightening the screws or bolts 214 within the apertures 216 of the support 112.

Referring now to FIGS. 7-9 in particular, it will be seen that in the second embodiment 100 the interfaces of the joint 116, with the tip 114 at one end of the joint, and the support 112 at the other end, differs substantially from the interfaces of the first embodiment 10.

Figure 3:
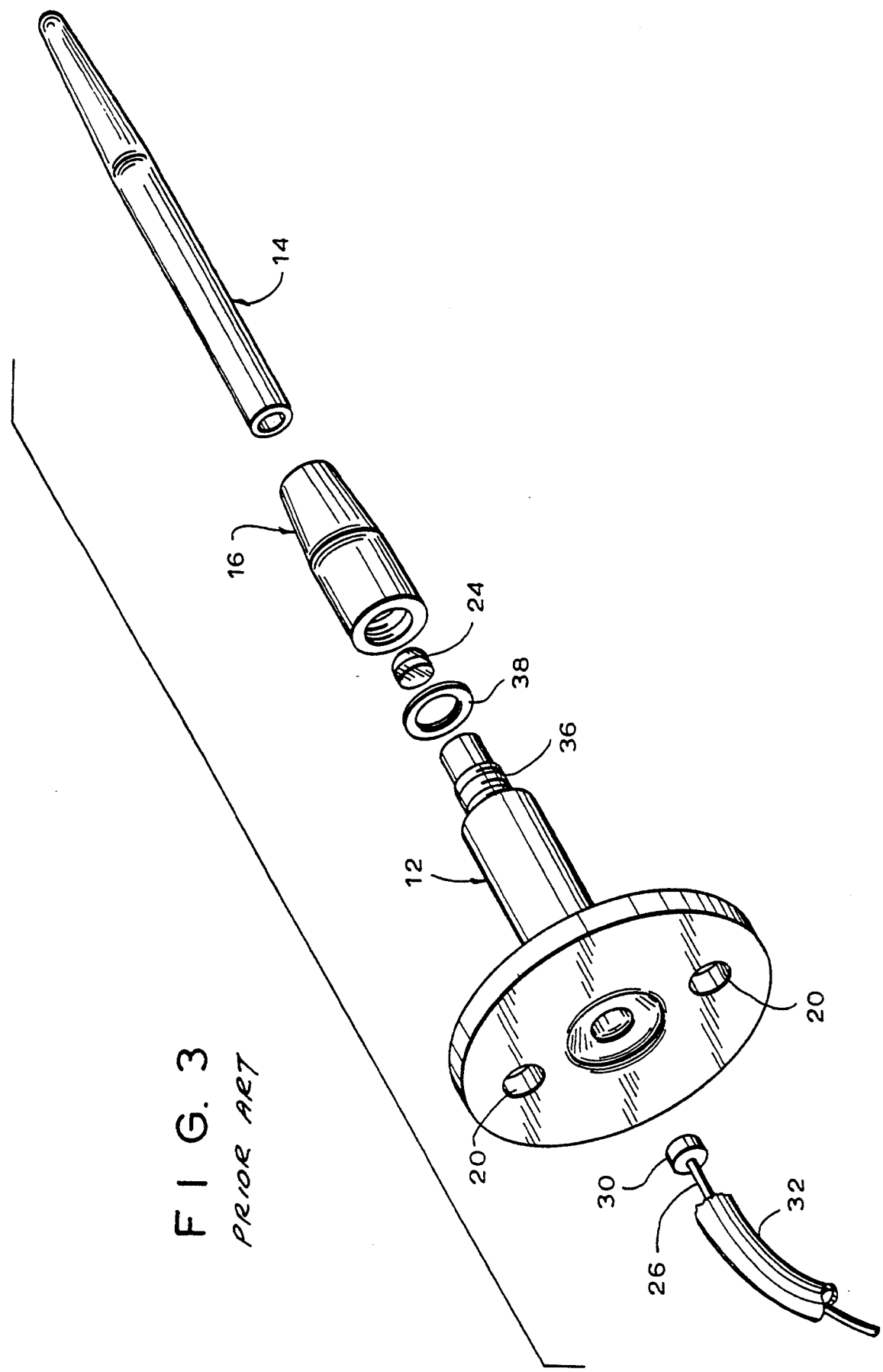
FIG. 3 is a fragmentary exploded isometric view thereof.

More particularly, whereas in the first embodiment 10 the joint 16 is secured to the support 12 by a threaded engagement 36, with a metallic O-ring 38 being disposed between the rear face of the joint 16 and an adjacent front face of the support 12 (see FIGS. 2 and 3), in the second embodiment 100 there is preferably no threaded engagement of the joint 116 with the support 112, but rather a laser weld or other direct metallurgical bonding of the joint 116 and support 112.

It has been found through experimentation with the first embodiment 10 that the breakage area of the probe tip was primarily either on its rear surface or on its sidewall immediately in front of the brazed joint constituting the interface between the tip and the support joint that is, on the back outer corner 255 of the tip 14. Accordingly, whereas in the first embodiment 10 a front face of the joint 16 directly abutted against the back surface of the tip 14 (see FIG. 2), in the second embodiment 100 the back face 252 of the tip 114 is longitudinally spaced from the front face 254 of a reduced diameter portion of the joint 116 by a gap 256 of sufficient length to ensure that there is at no time, under foreseeable temperature conditions, a direct contact between the faces 252, 254. Thus, the transition geometry of the back portion of the joint 116 provides a gap 256 which will allow for a relatively unhindered thermal expansion of the tip 114 and joint 116 in the axial direction without inducing unwanted stresses therein which might cause fracture of the tip face 252. The gap 256 is preferably at least 0.001 inch.

Still referring to FIGS. 7-9 in particular, the second embodiment 100 further differs from the first embodiment 10 by providing the forward portion of the joint 116 with a transition geometry as well. Whereas in the first embodiment 10 the joint 16 has a gradual taper of its leading sidewall defined by the outer edge of the joint 16 tapering inwardly, in the second embodiment 100 the joint 116 tapers into a longitudinally-extending sidewall 260. A portion 262 of that joint sidewall 260 overlaps and supports a longitudinally extending portion of the sidewall 264 of tip 114. It has been found that overlapping and supporting portion sidewall 262 preferably has a thickness of 0.008–0.012 inch, preferably about 0.010 inch, to reduce the stress created in the tip by the supporting portion sidewall. While thicker sidewall portions are easier and cheaper to manufacture, they increase the likelihood of tip fracture, and thinner sidewalls are very expensive to manufacture and do not provide adequate strength.

Further, the sidewall 260 preferably extends slightly further forwardly than the portion 262, terminating in a slight reverse bend which gradually takes the forward end 266 of the joint sidewall 260 away from the tip sidewall 264, without any sharp discontinuity. Thus, it will be appreciated that the tip 114 and the joint 116 are in physical contact only through the high temperature braze 134 disposed intermediate sidewall portions 262, 264.

Referring now to FIG. 8, to form the brazed joint/tip interface, a fixture (not shown) is used to appropriately vertically position the joint and tip, with the front thereof pointing upwardly, thereby defining a small radial gap 268 between the sidewall portions 262, 264. (Thus the assembly is rotated 90° in FIG. 8). The high temperature brazing alloy 134 is disposed intermediate joint forward end 266 and the tip sidewall portion 264. Thereafter, the interface is subjected to the high temperature required for brazing (about 1550° F. for AgCu braze) and, as illustrated in FIG. 9 where the assembly is still rotated 90°, the metal joint portion 262 undergoes a radial expansion greater than the radial expansion of the tip portion 264, thereby appreciably expanding the radial gap 268 so that the now liquid braze 134 is drawn therein by capillary action. The quantity of braze 134 must be sufficient to fill the radial gap 268 so that there are no discontinuities in the braze between the two members, yet should be limited so that there is not excessive spillage of the braze. Finally, the interface is allowed to slowly cool, thereby to minimize the development of thermal stresses at the interface. The joint sidewall portion 262 will slightly compress the tip sidewall 264 as it cools since the thermal coefficient of expansion of the metal joint 116 is greater than that of the ceramic tip 114. However, the differential in thermal coefficients of expansion is not so great that the tip cannot withstand a slow (30–60 minute) cooling of the interface, especially as the very thin joint sidewall portion 262 is itself capable of yielding slightly.

Because the two elements 114, 116 are fixed together by the braze 134 at an elevated temperature comparable to an actual use temperature, the stress imposed on the ceramic tip by the metal joint is minimized at the braze temperature rather than at room temperature. Additionally, there is less tendency for the very thin joint sidewall portion 262 to stress the tip sidewall 264 at elevated use temperatures, thus reducing the stresses which might result in breakage of the tip in adjacent areas.

In the second embodiment 100, preferably the tip 114 is SiC, the braze 134 is Ag or CuAg, and the joint 116 is Kovar.

The probe is especially designed for detecting the temperature of a high-temperature, high-velocity gas stream, such as the exhaust stream of an aircraft engine turbine, where vibration is a well-recognized major problem, although obviously the probe is also useful in less demanding applications (such as a combuster where the gas stream has a lower velocity and there is less of a vibration problem.

Now that the preferred embodiments of the present invention have been shown and described in detail, various modifications and improvements thereon will become readily apparent to those skilled in the art. Accordingly, the spirit and scope of the present invention is to be broadly construed and limited only by the appended claims, and not by the foregoing disclosure.

We claim:

1. An optical probe for a gas temperature sensor for sensing the temperature of a high-temperature, high-velocity gas stream, comprising:
   (A) a generally conical hollow tip for insertion into the gas stream formed of a ceramic selected from the group consisting of silicon carbide and silicon nitride to emit electromagnetic radiation at the high temperatures to be sensed, said tip defining a longitudinally-extending tip sidewall;
   (B) support means for mounting said tip for interaction with the high-temperature, high-velocity gas stream;
   (C) a joint physically interconnecting and spacing apart said support means and said tip, said joint being of a material and geometry to accommodate the thermal stresses caused by differences in thermal coefficients of expansion between said tip, said joint and said support means and the mechanical stresses caused by the interaction of said probe and the gas stream during high velocity movement of the gas stream past said tip, thereby to enable said probe to withstand said stresses said joint being welded to said support means and defining a longitudinally-extending joint sidewall having a portion thereof with a thickness of about 0.008–0.012 inch overlapping and supporting a longitudinally-extending portion of said tip sidewall; and
   (D) optical means, disposed in said tip and responsive to the temperature of the gas stream proximate said tip, for focusing and transmitting electromagnetic radiation emitted from said tip in response to the temperature of the gas stream proximate said tip in order to effect a measurement of the temperature of the gas stream.

2. The probe of claim 1 wherein said tip is characterized by a high flexural strength, a high oxidation resistance, a high thermal shock resistance, and a low thermal response time constant.

3. The probe of claim 1 wherein said joint is formed of a material selected from the group consisting of molybdenum and an alloy of iron/nickel/cobalt/manganese, said joint being connected to said tip by a high temperature braze.

4. The probe of claim 1 wherein said optical means comprises a lens positioned within said tip to focus infrared energy emitted from said tip, and said probe additionally includes an optical fiber positioned proximate said lens to transmit focused infrared energy to an infrared detector, and an infrared detector for providing a measurement of the temperature of the gases in the gas stream.

5. The probe of claim 4 wherein said optical means is removably supported in said tip, thereby to enable repair and replacement of said optical means without removal of said tip.

6. The probe of claim 1 wherein said joint and said tip are in physical contact only through a high temperature braze disposed intermediate said sidewall portions.

7. The probe of claim 6 wherein a back outer corner of said tip is spaced from said joint.

8. In combination, the probe of claim 1 and an aircraft engine producing a high velocity, high-temperature exhaust, gas stream, said tip being disposed in the exhaust gas stream of said engine.

9. An optical probe for a gas temperature sensor for sensing the temperature of a high-temperature, high-velocity gas stream, comprising:

(A) a generally conical hollow tip for insertion into the gas stream formed of a ceramic selected from the group consisting of silicon carbide and silicon nitride to emit electromagnetic radiation at the high temperatures to be sensed, said tip defining a longitudinally-extending tip sidewall, said tip being characterized by a high flexural strength, a high oxidation resistance, a high thermal shock resistance, and a low thermal response time constant;

(B) support means for mounting said tip for interaction with the high-temperature, high-velocity gas stream;

(C) a joint physically interconnecting and spacing apart said support means and said tip, said joint being of a material and geometry to accommodate the thermal stresses caused by differences in thermal coefficients of expansion between said tip, said joint and said support means and the mechanical stresses caused by the interaction of said probe and the gas stream during high velocity movement of the gas stream past said tip, thereby to enable said probe to withstand said stresses, said joint being welded to said support means and defining a longitudinally-extending joint sidewall having a portion thereof with a thickness of about 0.008-0.012 inch overlapping and supporting a longitudinally-extending portion of said tip sidewall, said joint being formed of a material selected from the group consisting of molybdenum and an alloy of iron/nickel/cobalt/manganese, said joint and said tip being in physical contact only through a high temperature braze disposed intermediate said sidewall portions, a back outer corner of said tip being spaced from said joint; and (D) optical means, supported in said tip and responsive to the temperature of the gas stream proximate said tip, for focusing and transmitting electromagnetic radiation emitted from said tip in response to the temperature of the gas stream proximate said tip in order to effect a measurement of the temperature of the gas stream.

10. An optical probe for a gas temperature sensor for sensing the temperature of a high-temperature, high-velocity gas stream, comprising:

(A) a generally conical hollow tip for insertion into the gas stream formed of a ceramic selected from the group consisting of silicon carbide and silicon nitride to emit electromagnetic radiation at the high temperatures to be sensed, said tip defining a longitudinally-extending tip sidewall;

(B) support means for mounting said tip for interaction with the high-temperature, high-velocity gas stream;

(C) a joint physically interconnecting and spacing apart said support means and said tip, said joint being of a material and geometry to accommodate the thermal stresses caused by differences in thermal coefficients of expansion between said tip, said joint and said support means and the mechanical stresses caused by the interaction of said probe and the gas stream during high velocity movement of the gas stream past said tip, thereby to enable said probe to withstand said stresses, said joint being welded to said support means and defining a longitudinally-extending joint sidewall having a portion thereof overlapping and supporting a longitudinally-extending portion of said tip sidewall; and (D) optical means, removably supported in said tip and responsive to the temperature of the gas stream proximate said tip, for focusing and transmitting electromagnetic radiation emitted from said tip in response to the temperature of the gas stream proximate said tip in order to effect a measurement of the temperature of the gas stream.

11. The probe of claim 10 wherein said tip is characterized by a high flexural strength, a high oxidation resistance, a high thermal shock resistance, and a low thermal response time constant.

12. The probe of claim 10 wherein said optical means comprises a lens positioned within said tip to focus infrared energy emitted from said tip, and said probe additionally includes an optical fiber positioned proximate said lens to transmit focused infrared energy to an infrared detector, and an infrared detector for providing a measurement of the temperature of the gases in the gas stream.

13. The probe of claim 10 wherein said joint sidewall portion has a thickness of about 0.008–0.012 inch.

14. In combination, the probe of claim 10 and an aircraft engine producing a high velocity, high-temperature exhaust gas stream, said tip being disposed in the exhaust gas stream of said engine.

15. An optical probe for a gas temperature sensor for sensing the temperature of a high-temperature, high-velocity gas stream, comprising:

(A) a generally conical hollow tip for insertion into the gas stream formed of a ceramic selected from the group consisting of silicon carbide and silicon nitride to emit electromagnetic radiation at the high temperatures to be sensed, said tip defining a longitudinally-extending tip sidewall, said tip being characterized by a high flexural strength, a high oxidation resistance, a high thermal shock resistance, and a low thermal response time constant;

(B) support means for mounting said tip for interaction with the high-temperature, high-velocity gas stream;

(C) a joint physically interconnecting and spacing apart said support means and said tip, said joint being of a material and geometry to accommodate the thermal stresses caused by differences in thermal coefficients of expansion between said tip, said joint and said support means and the mechanical stresses caused by the interaction of said probe and the gas stream during high velocity movement of the gas stream past said tip, thereby to enable said probe to withstand said stresses, said joint being welded to said support means and defining a longitudinally-extending joint sidewall having a portion thereof overlapping and supporting a longitudinally-extending portion of said tip sidewall, said joint being formed of a material selected from the group consisting of molybdenum and an alloy of iron/nickel/cobalt/maganese, said joint and said tip being in physical contact only through a high temperature braze disposed intermediate said sidewall portions, a back outer corner of said tip being spaced from said joint;

(D) optical means, removably disposed in said tip and responsive to the temperature of the gas stream proximate said tip, for focusing and transmitting electromagnetic radiation emitted from said tip in response to the temperature of the gas stream proximate said tip in order to effect a measurement of the temperature of the gas stream, said optical means comprising a leans positioned within said probe to focus infrared energy emitted from said tip;

(E) an optical fiber positioned proximate said lens to transmit focused infrared energy to an infrared detector; and (F) an infrared detector for providing a measurement of the temperature of the gases in the gas stream.

* * * * *